Jan. 9, 1940.  L. G. HOOPER ET AL  2,186,923
APPARATUS FOR REMOVING CONDENSATE FROM PIPELINES
Filed Dec. 11, 1936  3 Sheets-Sheet 1
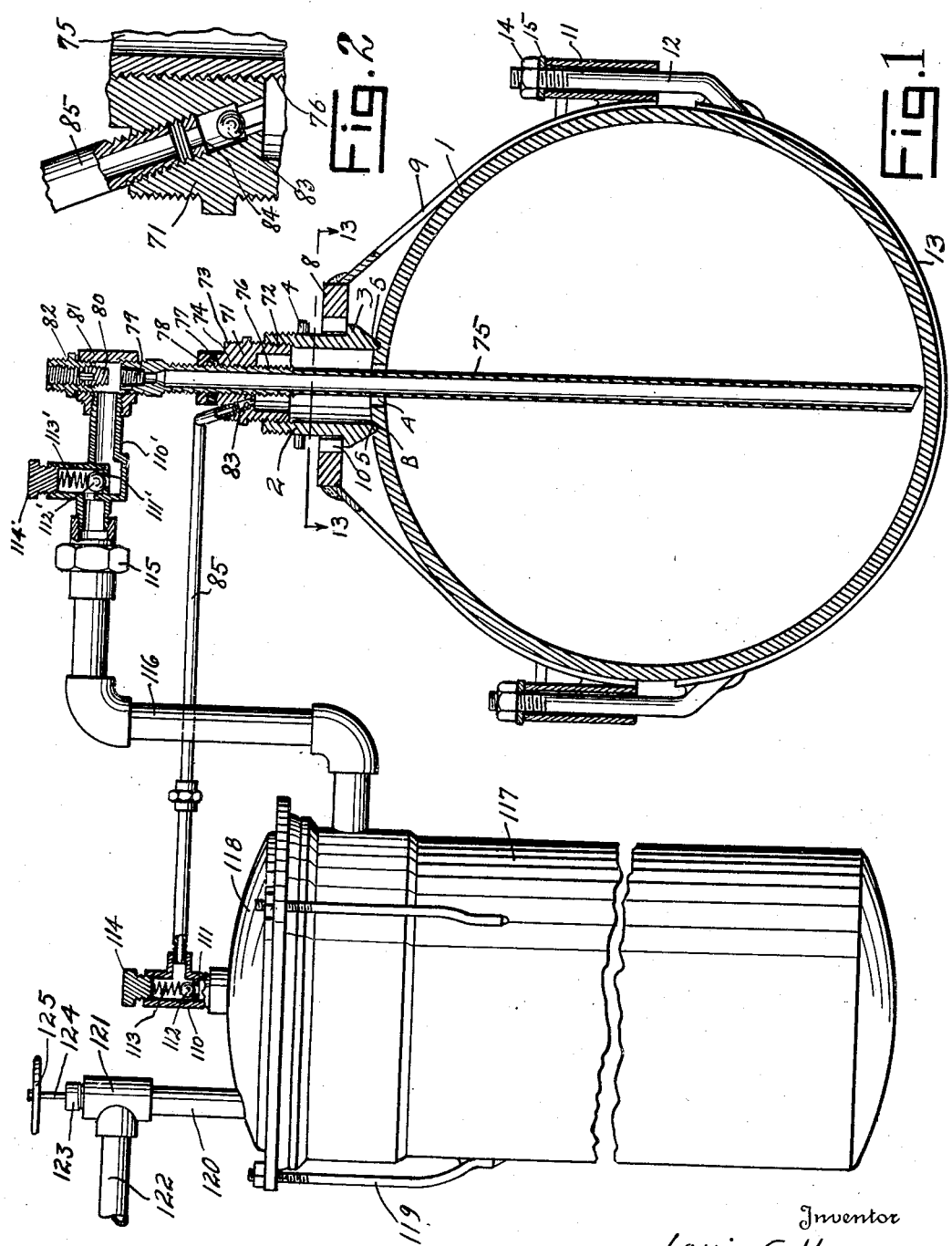
Inventor
Louis G. Hooper.
Virgil I. Hooper.
By J. Vincent Martin
and Ralph R. Browning
Attorneys Jan. 9, 1940.                L. G. HOOPER ET AL                2,186,923
            APPARATUS FOR REMOVING CONDENSATE FROM PIPELINES
                   Filed Dec. 11, 1936          3 Sheets-Sheet 2
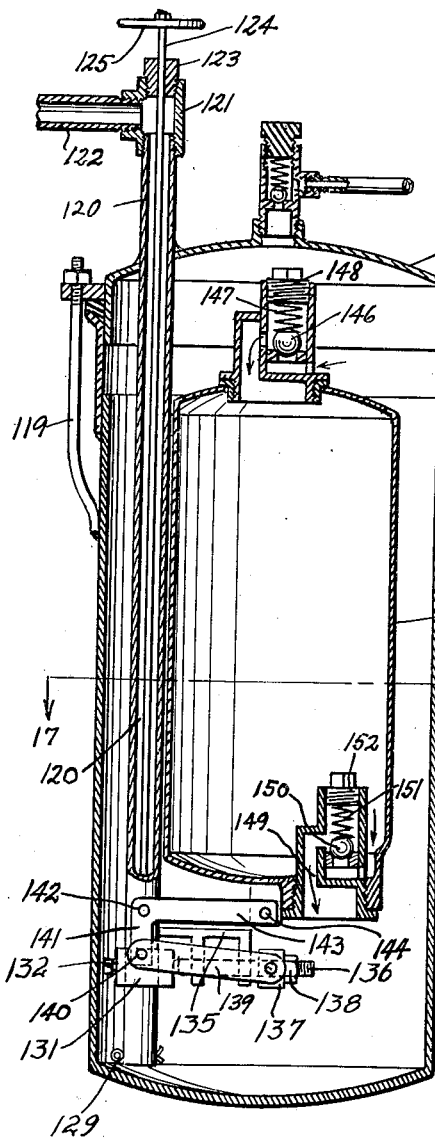
Fig. 3
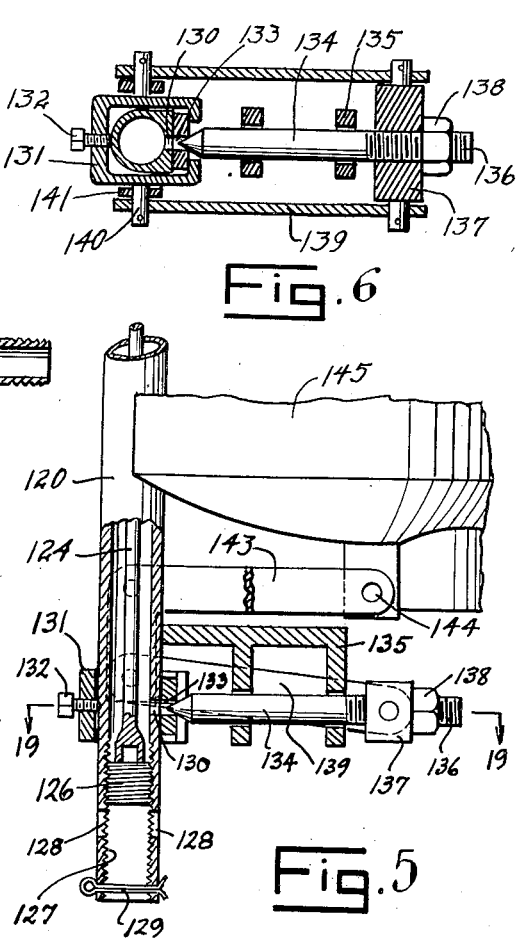
Fig. 6
Fig. 5
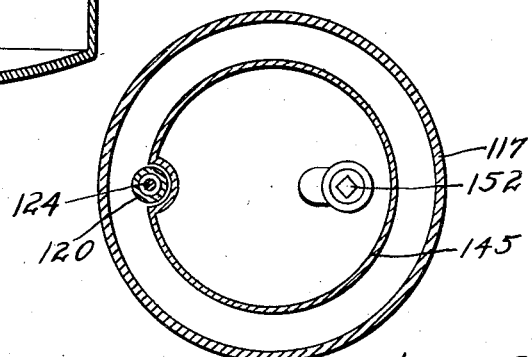
Fig. 4
Inventor
Louis G. Hooper.
Virgil I. Hooper.
By J. Vincent Martin
and Ralph R. Browning
Attorneys

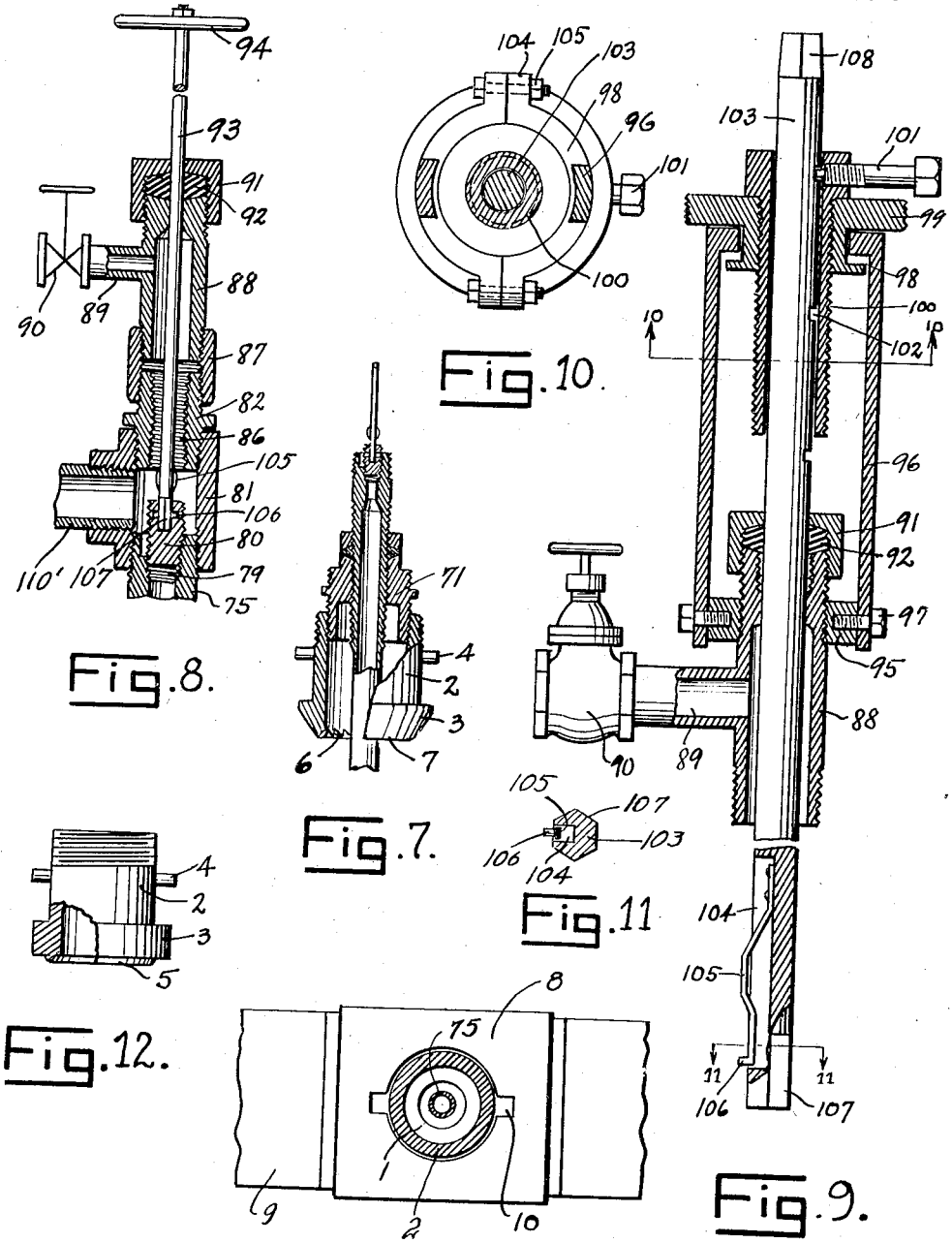

Patented Jan. 9, 1940

2,186,923

UNITED STATES PATENT OFFICE 2,186,923

APPARATUS FOR REMOVING CONDENSATE FROM PIPELINES

Louis G. Hooper, Sarepta, La., and Virgil I. Hooper, Gordon, Tex., assignors to The Bastian-Blessing Company, Chicago, Ill., a corporation of Illinois Application December 11, 1936, Serial No. 115,365

4 Claims. (Cl. 137—78)

This invention relates in general to a means for removing from a pipe line any liquid which may have become trapped therein. More specifically, it relates to means whereby a gas pipe carrying gas under pressure may be connected to a means for controlling the escape of liquid from the pipe without releasing the pressure existing in the pipe, and to a means for controlling the escape of liquid from the pipe.

In present day practice it is customary to transport gaseous substances, particularly natural gas, from one place to another by means of pumping it through a high pressure pipe line. Natural gas not only contains a certain amount of vaporized distillate, such as gasoline, etc., but may contain certain other liquids which upon a chilling of the gas will condense, and where the gas is being conveyed through a pipe line will collect upon the walls of the pipe and form pools at low points in the pipe line. It will readily be appreciated that if this condensate is permitted to accumulate, it will first restrict the flow of gas by cutting down the cross section of the area available for flow, and will ultimately cause almost a complete stoppage of the pipe line.

In view of the foregoing, it is an object of this invention to provide means for removing condensate therefrom, or other desired means connected thereto without releasing the pressure existing within the pipe line. It is a further object to provide such a means by which the tapped opening may, if desired, be plugged without releasing the pressure from the pipe line. Another object is to provide such a means by which the means for removing condensate may be shut off from the pipe line.

Another object is to provide a means for removing condensate from the pipe line, which means will provide for the removal of the condensate and at the same time prevent the wastage of gas from the pipe line.

Another object is to provide a means for removing condensate from a pipe line which will operate by virtue of fluctuations of the pressure existing within the pipe line.

Another object is to provide a device whereby a line leading from a high pressure supply may be plugged or unplugged without opening the line to the escape of fluid under pressure, and whereby the expense of leaving valves and other equipment on a line to close openings therein may be avoided.

Other objects and advantages will become apparent from the following description taken in connection with the accompanying drawings, it being understood that such description and drawings are by way of illustration only, and not by way of limitation. This invention is to be limited only by the prior art, and by the terms of the appended claims.

In the drawings:

Fig. 1 is a view illustrating a vertical cross section through a pipe line having a device for removing condensate attached thereto in accordance with this invention.

Fig. 2 is an enlarged sectional view of a portion of the apparatus shown in Fig. 1.

Fig. 3 is an enlarged vertical cross section of the condensate receptacle illustrated in elevation in Fig. 1.

Fig. 4 is a horizontal sectional view taken along the line 17—17 of Fig. 3.

Fig. 5 is a view partly in vertical cross section illustrating the details of the valve shown in the lower portion of Fig. 3.

Fig. 6 is a horizontal sectional view taken along the line 19—19 of Fig. 5.

Fig. 7 is a view illustrating details of the connection to a pipe line of a means for removing condensate therefrom.

Fig. 8 is an enlarged vertical section view illustrating a device for plugging and unplugging the connection shown in Fig. 7 without opening the connection for the escape of pressure fluid.

Fig. 9 is a view illustrating a slight modification of the device shown in Fig. 8, such modification being for use where extremely high pressures are encountered.

Fig. 10 is a horizontal cross section taken along the line 10—10 of Fig. 9.

Fig. 11 is a horizontal cross section taken along the line 11—11 of Fig. 9.

Fig. 12 is a view illustrating a slightly modified form of connection to a pipe line for use in connection with the apparatus shown in Figs. 1 to 7, inclusive.

Fig. 13 is a horizontal cross section taken along the line 13—13 of Fig. 1.

In Fig. 1 I have shown a portion of a pipe line 1 to which is attached and connected the apparatus for removing condensate from said pipe line, which apparatus forms the subject-matter of the present invention. The pipe line 1 may be provided at its upper portion with an aperture A which may be formed in the pipe line by any suitable main tapping apparatus after the pipe line has been installed, and without loss of pressure or contents from the pipe line. A fitting or nipple 2 surrounds the aperture A in the pipe line, and said fitting may be provided with a tapered terminal portion 5 seating within an annular groove B provided in the exterior surface of the pipe and concentrically disposed with respect to the aperture A. The nipple or fitting 2 is provided with an upwardly facing shoulder 3 for a purpose to be presently described. Above the shoulder 3 and in spaced relation thereto the fitting 2 is provided with projecting lugs or pins 4. The lugs 4 may be engaged by a suitable turning tool to rotate the fitting 3 as it is being drawn into position within the groove B by means to be presently described, in order to insure a gas-tight fit of the tapered end 5 within said groove.

Loosely mounted upon the nipple or fitting 2 and abutting the shoulder 3 is an apertured plate member 8, said plate being provided with a central aperture to receive the body of the nipple 2 and with slots 10 (see Fig. 13) to receive the lugs 4 and to facilitate passage of the plate member over the upper end of the nipple and lugs, into seating relation upon the upper surface of the shoulder 3. The plate 8 at opposite ends has secured thereto strap members 9 which terminate in lugs or ears 11, the latter being provided with apertures or bores to receive screw-threaded bolt members 12 carried by a complemental section of band 13. Thus, as clearly shown in Fig. 1, the band member 13 in conjunction with the bands 9 carried by the plate 8, embrace the pipe member 1, and by means of the cooperating bolts 12 and ears 11, the band members 9 and 13 may be drawn tightly about the pipe by nuts 14 screw-threaded upon the ends of the bolts 12 projecting beyond the upper ends of the ears 11. By thus tightly drawing the bands 9 and 13 about the pipe, the nipple 2 may be secured in gas-tight relation within the groove B, as shown.

The fitting 2 when thus attached to the pipe line 1 provides means for attaching to said pipe the condensate removing apparatus now to be described. The fitting 2 at its upper end is interiorly screw-threaded to receive a suitable threaded bushing 71. The bushing 71 is provided with a threaded opening extending entirely therethrough as shown at 74, and adapted to receive the tubing section 75. This tubing section is provided with threads 76 adjacent its upper end for threadedly engaging the threads 74, and the lower end thereof is externally smooth so as to pass freely through this opening in the bushing 71. Mounted on the upper end of the bushing 71 is a packing member 77 adapted to be compressed by a nut 78 also threaded on the threaded section 76 of the tubing 75. This packing member 77 is for the purpose of positively preventing the leakage through the bushing past the threads 74 and 76. At its upper end, the tubing 75 is threaded internally as shown at 79 to receive a plug 80. The upper end of the tubing section 75 is also threaded externally to receive one arm of the T-fitting 81. To the other arm of this T-fitting is threaded a bushing 82, this bushing being threaded internally at its lower end to receive the plug member 80.

Laterally positioned with respect to the threaded opening 74 through the bushing 71 is another opening having a check valve 83 therein adapted to prevent upward flow through the bushing. This valve 83 is provided with a seat member 84 against which it may seat to prevent such upward flow. The opening above the valve is tapped to receive a line 85 for a purpose to be presently set forth.

A T connection 81 is then placed in position on the upper end of the tubing section 75 with the bushing 82 threaded into its upper end. In addition to its internal threads 86, the bushing is provided with external threads at its upper end for the reception of a collar 87 to which is secured a special fitting 88 having a lateral branch 89 thereon connected with a bleeder valve 90. At its upper end, this special fitting is adapted to receive a packing nut 91 for securing in place and compressing a packing 92 about the shaft 93 of a wrench member. This wrench member may be rotated in any desired manner as by a hand wheel 94, and its lower end is constructed in the manner to be presently described.

In Fig. 9 there is illustrated a slight modification of this equipment in which a ring 95 is threadedly engaged with the exterior of the special fitting 88 below the packing nut 91, and to this ring 95 is secured a yoke-like member 96 by means of screws 97 or the like. At its upper end, this yoke-like member is formed with an inwardly extending annular flange 98 adapted to engage a groove formed in a knurled nut 99. This nut is internally threaded to receive a bushing 100 which in turn carries a set screw 101 for engaging notches 102 in the modified shaft 103 of the wrench herein disclosed.

The lower end of this shaft is formed in the same manner as the shaft 93 shown in Fig. 8, and has a groove 104 within which is positioned a spring member 105, the lower end of which extends outwardly as shown at 106. This lower end, it will be seen, can be moved inwardly and outwardly by finger pressure upon an intermediate portion of the spring 105. The lower end of the shaft 103 is formed with a square or other non-circular cross section 107, and the upper end is similarly formed at 108.

The tubing line 85 which has been previously referred to is also connected to the bushing 71 in the opening provided therefor, and at its opposite end is secured to the leg of a special T-fitting 110. Within one of the branches of this fitting there is provided a valve seat 111 which is preferably of rubber or some similar substance. This valve seat is adapted to receive a valve member 112 which is normally held thereagainst by a spring 113. The other leg of the fitting is provided with a plug 114 which serves as an abutment for the end of the spring 113 opposite the valve element 112. It will be seen that this valve element 112 acts in the same direction as the valve element 83, and serves to prevent flow from the pipe line through the tubing line 85 while permitting flow in the opposite direction.

Connected to the leg of the T-fitting 81 there is also a special fitting 110' within which is positioned a valve seat 111' likewise preferably of rubber or some like material. The valve 112' is adapted to seat against this valve seat, and is urged to such seated position by means of a spring 113' abutting at its opposite end against a plug 114'. This special fitting is connected by means of a union 115 to a pipe 116 leading to the receptacle 117 for the purpose of receiving the condensate from the pipe line. It is to be noted that the valve 112', unlike the valves 83 and 112, is so disposed as to permit passage only from the pipe line toward the receptacle 117. It is also noted that the tubing section 75 to which the valve 112' and the pipe 116 are connected extend substantially to the bottom of the pipe line, only sufficient space being left to permit the ingress of fluid thereto. It is noted that the pipe 116 is connected to the receptacle 117 at a point adjacent the upper end thereof, and that the tubing line 85 is connected through the T-fitting 110 at a position also substantially at the top of the receptacle 117.

Referring now to the details of the structure within the receptacle 117, attention is directed to Figs. 3 to 6, inclusive. From these it will be noted that the receptacle 117 is provided with a cover 118 secured in place by bolts 119 which are integrally joined to the outer wall of the receptacle 117. Extending through the top of this receptacle is a tubular member 120 having a T-fitting 121 at its upper end exteriorally of the receptacle. The outer walls of this tubing are sealed to the top of the receptacle by means of welding or a similar process so as to prevent the passage of gas or other fluid from the receptacle around the outside of the tube. The tubing 120 is connected to one arm or branch of the T-fitting 121, and to the leg thereof is connected a pipe 122 leading to some suitable receptacle into which the condensate taken from the pipe line is finally to be discharged. The other arm of the T-fitting is provided with a bushing 123 through which the rod or shaft 124 is adapted to pass with a substantially fluid tight fit. This rod has a hand wheel 125 or similar means for turning the same positioned on the upper end thereof, and extends downwardly to a point adjacent the lower end of the tubing 120 where it engages a plug 126 threadedly mounted in the interior of the lower end of the tubing, the lower end of the tubing being threaded as shown at 127 for this purpose. Lateral openings 128 are provided at a position spaced above the lower end of the tubing and intermediate the ends of the threaded section 127, so that the plug 126 may be moved by means of the rod 124 to occupy a position either above or below the openings 128. A cotter key or similar device 129 is preferably provided at the lower end of the tubing 120 for the purpose of preventing the accidental movement of the plug 126 out through the lower end of this tubing.

At a position above the threaded section 127 the tubing 120 is provided with a lateral opening 130. A clamping member 131 having a set screw 132 for bearing against the tubing member 120 is provided for the purpose of clamping a valve seat member 133 in place with an opening therethrough registering with the opening 130. Adapted to seat against this valve seat is a needle valve 134 guided and supported by means of a bracket 135 which may be mounted on the tubing section 120. The end of the valve member 134 is threaded at 136 to receive a driving nut 137 and a lock nut 138. Pivotally connected to opposite sides of the nut 137 are links 139 which extend back toward the tubular member 120, and are pivotally connected at 140 to the short arm 141 of a bell crank which is pivotally mounted at 142. The long arm 143 of this bell crank is pivotally connected at 144 to a lug on the lower end of a hollow float 145.

At the upper end of the float 145 there is provided an opening to which is connected a special fitting having therein a check valve element 146. This valve element is so arranged as to permit flow into the hollow float member but to prevent flow outwardly therefrom. It is pressed against its seat normally by means of a spring 147 abutting against a plug 148. This plug may of course be removed for purposes of repair or inspection whenever desired.

At the lower end of the float 145 there is a second opening to which is connected a second special fitting having a passageway 149 therethrough and a valve 150 therein. This valve is so arranged as to permit flow outwardly from the hollow float, but so as to prevent flow inwardly thereto. It is held in position against its seat by means of a spring 151 abutting against a plug 152, it being apparent that the plug 152, whenever desired, may be removed for purposes of inspection or repair.

It will be appreciated that the receptacle 117 will be connected to the equipment already on the pipe line while the plug 80 is threaded into the upper end of the tubing section 75, so that during the time these connections are being made no flow from the pipe line will be permitted despite the high pressure existing therein. Normally, also, the plug 126 will occupy the position illustrated in Fig. 18 of the drawings so as to prevent influx of fluid to the tubing 120 except through the valved opening 130.

After the connections 85 and 116 have been put in place, and with either the equipment shown in Fig. 8 or that shown in Fig. 9 in position on the upper end of the T-fitting 81, the plug 80 is removed from the upper end of the nipple 75 and screwed into the lower end of the bushing 82. This equipment is placed in position by first pressing the spring finger 105 into the slot 104 and inserting the lower end 107 of the wrench member into the opening in the plug 80. The bushing 82 and the remaining equipment is then screwed into position, and with the valve 90 closed the rod 93 or 103, as the case may be, is rotated to the left to remove the plug 80 from the upper end of the tubing section 75. It is noted that there is a slight cut-away portion at the upper end of this tubing section so that before the plug is disengaged from the tubing section a "bleeding" may take place from the tubing section into the T connection thereabove, and the pressure in the T connection, in the pipe 116, and in the receptacle 117 will be permitted to rise to an amount equal to the pressure existing in the pipe line. The plug 80 will then be removed from the tubing section 75 and drawn upwardly and screwed into threaded engagement with the bushing 82, thus closing this bushing. The coupling 87 with the equipment thereabove may then be unscrewed and the wrench 93 may be detached from the plug. It is noted that if the pressure within the nipple 88 is too high to permit the plug 80 from being screwed into the bushing 82, the valve 90 may be opened slightly as the plug is started into the bushing 82 so as to relieve the pressure above the plug, and permit it to be screwed tightly into the bushing.

With the equipment thus connected, it will be apparent that the pressure within the pipe line will force the liquid within which the lower end of the tubing section 75 is disposed out through the tubing section 75, through the T fitting 81 and the valve 112, and through the pipe 116 into the receptacle 117 until such time as the pressure within the receptacle 117 becomes substantially as great as that within the pipe line 1. In view of the fact that the pressure within pipe lines of the type to which this invention applies is customarily fluctuating, there will come a period when this pressure within this pipe line is falling. When this occurs, the pressure existing within the receptacle 117 will "bleed" back through the valves 112 and 83, and through the tubing line 85 into the pipe line 1, thus reducing the pressure in the receptacle 117 to a value equivalent to that existing in the pipe line. When the pressure in the pipe line again rises, more liquid will be forced from the lower portion thereof in the manner just described, and this process will continue until substantially all liquid has been removed from the pipe line. When no more liquid remains within the pipe line, a rise of pressure within the pipe line will simply force certain quantity of gas into the receptacle 117 to build up the pressure therein, and when the pressure falls, this gas will flow back through the line 85 into the pipe line so that no gas will be lost. The equipment will thus remove liquid from the pipe line as long as any liquid remains therein, but when no liquid is present in the pipe line, no gas will be lost therefrom.

As the liquid level builds up within the receptacle 117, it will eventually rise to a point where the float 145 will be lifted. Through the bell crank above described and the links 139 the valve 134 will be moved from its seat so as to permit the pressure existing within the receptacle 117 to force the liquid out through the port 130 and the tubing 120 until the float again falls to a position where this valve will be closed. If at any time it is desired to remove substantially all of the liquid from the receptacle 117, this may be done by simply rotating the handle 125 to move the plug 126 downwardly to a position below the openings 128. Liquid will then be forced in through these openings and out through the tubing 120 until substantially all the liquid has been removed from the receptacle 117. It is to be noted that if so desired, after the plug has been located in the position shown in Fig. 18, the rod 124 may be removed from the tubing 120 and a plug substituted for the bushing 123, thus preventing unauthorized persons from moving the plug 126 downwardly and opening the receptacle, thus subsequently rendering the equipment inoperative.

With reference to the float proper, it is noted that this float will be at all times substantially free from any liquid present therein, because of the arrangement of the valves heretofore described. As previously noted, the pressure within the receptacle 117 will fluctuate. Let us suppose that some liquid has entered the float 145 either because of condensation from the gas therein, or because of some leak existing in the float. As the pressure rises in the receptacle 117, a small portion of the gas will enter through the valve 146 and increase the pressure within the float 145. Then as the pressure falls within the receptacle 117, the higher pressure existing within the float 145 will force the liquid present in the lower part of this float out through the valve 150. This process will be repeated as often as the fluctuations in the receptacle 117 occur, and it will be seen that the float will be at all times substantially free from any liquid therein.

If after the connection of a device such as above described for removing condensation from a pipe line, it be found that the device is no longer required because of the absence of further condensation, or if it be desired to detach and repair the device, the tubing section 75 may be closed by connecting thereto the equipment shown in either Fig. 8 or Fig. 9. If the pressure within the pipe line is not too great, the equipment shown in Fig. 8 will be employed because of its greater simplicity. With this equipment, it is simply necessary to connect the various parts as shown in Fig. 8, and to rotate the handle 94 to the right until the plug 90 is disengaged from the bushing 82, after which it is pushed downwardly and engaged with the upper end of the tubing section 75. It is then tightened to close the tubing section, and any or all of the equipment connected to the tubing section may be removed.

If an extremely high pressure exists within the pipe line such that it would be difficult or impossible to force the rod 93 of Fig. 8 downwardly when the plug 80 is disengaged from the bushing 82, the equipment shown in Fig. 9 will be employed. With this equipment, the plug is screwed downwardly in the same manner as with the equipment of Fig. 8, but when it has been disengaged from the bushing 82, and is being held thereagainst by the pressure within the pipe line, the nut 99 will be rotated to move the bushing 100 until the set screw 101 is opposite one of the notches 102 in the rod 103. The set screw will then be tightened to engage such notch, after which the nut 99 will be rotated in a direction to force the bushing 100 and the rod 103 downwardly against the pressure existing within the pipe line. By this means the plug 80 can be moved downwardly to a sufficient extent to cause it to enter the threaded upper end of the tubing section 75, and after it has been started, it will be tightened in the same manner as previously described.

From the foregoing it will be seen that an apparatus has been provided whereby a pipe line having pressure therein may have means connected thereto for automatically removing from the pipe line any condensate or other liquid which may gather therein. Provision has been made for automatically and manually purging the receptacle for such condensate, and in connection with the means for automatically purging the receptacle there has been provided a float which will constantly purge itself of any liquid contained therein. A plugging valve has also been provided for fully opening or plugging a conduit from such pipe line or the like without permitting escape of fluid therefrom or losing control of the pressure therein.

It will thus be appreciated that in the foregoing description and in the accompanying drawings there is set forth one embodiment of this invention whereby all of the objects and advantages sought by this invention may be obtained.

Having described our invention, we claim:

1. In a device for removing fluid from a member having a fluctuating gas pressure therein, and having a closed receptacle for the liquid to be removed, a conduit leading from the lower portion of said member to said receptacle, one-way valve means therein for preventing flow therethrough from said receptacle to the member while permitting flow from said member to said receptacle, a conduit leading from the upper portion of said receptacle to the upper portion of said member, and one-way valve means in said last mentioned conduit for permitting flow therethrough only toward said member.

2. In a device for removing liquid from a member having a fluctuating gas pressure therein, and having a closed receptacle for the liquid, means for conducting liquid from the bottom portion of said member to said receptacle when the pressure in said member rises, means for conducting a gas from said receptacle to said member when the pressure in said member falls, and means for preventing back flow in both of said conducting means.

3. In a device for removing liquid from a member having a fluctuating gas pressure therein, a closed receptacle for the liquid, means for conducting fluid from the bottom portion of said member to said receptacle when the pressure in said member rises, means for conducting gas from said receptacle to said member when the pressure in said member falls, means for preventing back flow in both of said conducting means, and means for closing said first mentioned conducting means against flow in either direction at a point adjacent said member.

4. In a device for removing liquid from a member having a fluctuating gas pressure therein, a closed receptacle for the liquid, means for conducting fluid from the bottom portion of said member to said receptacle when the pressure in said member rises, means for conducting a gas from said receptacle to said member when the pressure in said member falls, means for preventing back flow in both of said conducting means, means for closing said first mentioned conducting means against flow in either direction at a point adjacent said member, and means for actuating said last mentioned means and for preventing escape of pressure during such actuation.

LOUIS G. HOOPER.
VIRGIL I. HOOPER.